… … …

United States Patent Office 3,040,025
Patented June 19, 1962

3,040,025
ERYTHROMYCIN COMPOUNDS
Hubert W. Murphy, Indianapolis, Ind., assignor to Eli Lilly and Company, Indianapolis, Ind., a corporation of Indiana
No Drawing. Filed Aug. 31, 1953, Ser. No. 377,707
6 Claims. (Cl. 260—210)

This is a continuation-in-part of my application Serial Number 340,414 filed March 4, 1953.

This invention relates to antibiotic compositions and more particularly to carbonic acid esters of erythromycin.

Erythromycin is an antibiotic substance of value in the treatment of many infections. Therapeutic administration of erythromycin has in the past been only in the form of oral administration since parenteral administration is painful and irritating.

Oral administration of erythromycin preparations is characterized by certain disadvantages. For example, erythromycin and its common salts are extremely bitter and unpleasant to the taste. Moreover, erythromycin has a pronounced instability in the presence of acids such as those contained in the gastric juice, so that without special precautions oral administration may result in its substantial decomposition in the stomach with consequent reduction in therapeutic efficacy.

To avoid the disadvantages of oral administration it has been the practice to administer erythromycin in protected form, as for example, in the form of tablets, coated with an enteric substance such as cellulose acetate phthalate. However, enteric coatings are not applicable to finely divided substances to be administered in the form of suspensions, and consequently suspensions which are particularly applicable in pediatric use have heretofore been impractical.

I have discovered certain compounds of erythromycin which avoid the above enumerated disadvantages. The compounds comprise certain substituted carbonic acid esters of erythromycin.

My new compounds are readily prepared from erythromycin. They are relatively water-insoluble and are substantially free from taste. They can be administered orally in the form of aqueous suspensions, and the suspensions are relatively stable when buffered to above about pH 6.5. The compounds withstand for a sufficiently prolonged time the action of gastric acidity so that their oral administration is productive of a therapeutically effective blood level of erythromycin.

My new erythromycin compounds are prepared by reacting substantially equimolecular amounts of erythromycin and a chlorocarbonate ester having the formula

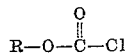

wherin R represents an aliphatic or an araliphatic hydrocarbon radical. Illustrative examples of chlorocarbonate esters within the scope of the above formula are the methyl, ethyl, crotyl, decyl, myristyl, benzyl, chlorobenzyl, cinnamyl, and methoxyphenethyl esters, and the like.

The reaction is carried out in a substantially anhydrous solvent and under neutral or slightly alkaline conditions. Solvents suitable for carrying out the reaction are those which do not contain reactive groups to interfere with the esterification process. Suitable nonreactive solvents include acetone, methyl, ethyl, ketone, ether, dioxane, benzene and cyclohexane. Neutral or alkaline conditions are secured through the use of organic alkalinizing agents such as pyridine or dimethylaniline, etc., or inorganic agents such as sodium bicarbonate, magnesium oxide and the like. Inorganic agents are preferred since they are easily separated from the reaction mixture by simple filtration.

As is well known to the art, the chlorocarbonic acid esters which are employed as starting materials, are readily prepared by reacting an alcohol with an equimolecular amount of phosgene, whereupon the chlorocarbonic ester is produced.

Th erythromycin esters which result from the reaction of erythromycin and chlorocarbonate esters are solids which are less soluble in water than erythromycin itself, but have appreciable solubility in the common organic solvents. The erythromycin esters dissolve in aqueous acids and form acid addition salts with relatively strong acids, but such salts are unstable in solution because of their relatively low pH.

The following examples more specifically illustrate the preparation and properties of compounds of this invention.

Example 1

To a solution of 300 g. of erythromycin in 2.5 liters of anhydrous acetone are added 150 g. of sodium bicarbonate. The mixture is stirred, and a solution of 45 ml. of ethyl chlorocarbonate in 100 ml. of acetone is added dropwise. The reaction mixture is stirred for about three hours following the addition of the ethyl chlorocarbonate solution. After standing for a few more hours at room temperature, the reaction mixture is filtered to remove the sodium chloride formed in the reaction and excess sodium bicarbonate. To the filtrate are added 2500 ml. of water containing 3 g. of sodium bicarbonate, and the mixture is allowed to stand overnight in a refrigerator at 5° C. The crystalline precipitate of erythromycin ethyl carbonate, which forms, is removed by filtration, is washed with 500 ml. cold distilled water, and dried in vacuo.

The ester prepared in the above manner is suitable for the preparation of therapeutic compositions. However, if further purification of the erythromycin ethyl carbonate is desired for analytical purposes or the like, substantially pure material is obtained in the following manner:

The ester is dissolved in about 10 parts of anhydrous acetone, and the solution is treated with about 0.2 percent w./v. of decolorizing carbon. Addition of an equal volume of distilled water to the acetone, results in the separation in crystalline form of the purified ester. The purified erythromycin ester is separated by filtration and dried in air.

Erythromycin ethyl carbonate is a white, crystalline, odorless and substantially tasteless substance. It is very soluble in ether, acetone, dioxane, chloroform, ethanol and methanol, and somewhat less soluble in benzene, cyclohexane and toluene. Erythromycin ethyl carbonate is soluble in water in an amount less than about 0.2 mg. per ml. The infrared absorption curve of the ester shows a new absorption peak (i.e. not possessed by erythromycin itself) at 7.9 microns. There is also an intensification of the absorption bands at 5.74 and 7.25 microns. The above absorption peaks appear to be common to all of the compounds of this invention.

A 1-percent solution of the ethyl carbonate ester of erythromycin in anhydrous chloroform showed a specific optical rotation at 24° C. for the D line of sodium light equal to −75.3°. The pK′α of erythromycin ethyl carbonate in methanol was found to be about 6.9. Elemental analyses has indicated the presence of about 58.40 percent of carbon, 8.99 percent of hydrogen, and 1.51 percent of nitrogen.

The melting point of the ethyl carbonate ester of erythromycin is indefinite, and is dependent in part upon the rate of heating in the melting point apparatus. When it is heated slowly in a capillary tube it begins to melt at about 121° C. but resolidifies and does not melt completely until the temperature is raised to about 135° C.

*Example 2*

The ethyl carbonate ester of erythromycin is also prepared in the following manner:

8.0 g. (ca. 0.0105 mole) of erythromycin are dissolved in 600 ml. of dry benzene, and 2.0 g. of magnesium oxide are added. A solution of 1.14 g. (0.010 mole) of ethyl chlorocarbonate

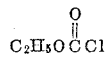

in 20 ml. of dry benzene is added dropwise with vigorous stirring over a half hour period. The reaction mixture is stirred for four hours, the magnesium oxide is removed by filtration, and the filtrate is concentrated to dryness in vacuo at room temperature. The residue comprising erythromycin ethyl carbonate is dissolved in 50 ml. of acetone, and is filtered to remove a small amount of insoluble material, and 50 ml. of water are added to the filtrate. The mixture is allowed to stand for a few hours whereupon the ester separated in crystalline form. The crystals are removed by filtration and washed with a small amount of 30 percent acetone. Two additional recrystallizations are carried out in a similar manner, yielding a product which melts at about 118–121° C. on a preheated Köfler block.

*Example 3*

30 g. of erythromycin are dissolved in 250 ml. of anhydrous dioxane containing 15 g. of sodium bicarbonate. 5 ml. of methyl chlorocarbonate are added to the mixture with stirring. Stirring is continued for two hours and the mixture is allowed to stand at room temperature for an additional period of several hours. The mixture is filtered to remove excess sodium bicarbonate and the sodium chloride formed during the reaction, and to the filtrate is added a solution of 2 g. of sodium bicarbonate in 500 ml. of water. The mixture is shaken and allowed to stand in the cold for about ten hours. The crystals of the erythromycin methyl carbonate which separate are filtered off and washed with a small amount of cold water. The crystals are dissolved in 250 ml. of acetone, and the solution is treated twice with 1 g. portions of decolorizing carbon. The solution of the erythromycin methyl carbonate ester freed from carbon by filtration is treated with 375 ml. of distilled water and chilled for several hours whereupon the ester separates in crystalline form. The ester is recrystallized by solution in 250 ml. of acetone and precipitation with 300 ml. of distilled water. The crystals are separated by filtration and are dried in vacuo over anhydrous calcium chloride.

Erythromycin methyl carbonate is a white crystalline, substantially tasteless and odorless compound. Electrometric titration has showed a pK'α of 6.6 (66 percent aqueous dimethyl formamide solution at 25° C.). The ultraviolet absorption spectrum is qualitatively the same as that of erythromycin ethyl carbonate as is the infra red absorption spectrum. The methyl carbonate ester of erythromycin melted (capillary tube) at about 127–131° C.

*Example 4*

The benzyl carbonate ester of erythromycin is prepared by substantially the same procedure as that described in Example 3, using benzyl chlorocarbonate obtainable commercially as a 20 percent solution in toluene. The benzyl ester is purified by treating the reaction mixture with a small amount of decolorizing carbon filtering to remove the carbon, and evaporating the solvent in vacuo. The amorphous residue of erythromycin benzyl carbonate is purified by recrystallizing it from acetone-water mixture followed by a further recrystallization process comprising dissolving the ester in dioxane and adding thereto about five volumes of cyclohexane to precipitate the ester in purified form.

Erythromycin benzyl carbonate is obtained in the form of white needles which are substantially tasteless and odorless. The ester melts at about 175–177° C. (capillary tube). Analyses show the presence of 62.54 percent carbon, 8.36 percent hydrogen, and 1.7 percent nitrogen. The infra red spectrum is qualitatively like that of the ethyl carbonate ester of erythromycin, and the ultra violet absorption spectrum is likewise similar to that of the ethyl ester except that the absorption is more intense and displays features characteristic of the presence of the benzene ring.

*Example 5*

Isopropyl chlorocarbonate is prepared by adding to a solution of phosgene in ether a molecular equivalent of isopropanol. The mixture is allowed to stand for about one hour and is then distilled. Isopropyl chlorocarbonate boils at 100–102° C. at atmospheric pressure.

The isopropyl carbonate ester of erythromycin is obtained by procedure described in Example 2, using isopropyl chlorocarbonate obtained as mentioned above.

*Example 6*

A benzene solution of octyl chlorocarbonate is obtained by adding an equivalent amount of octyl alcohol to a solution of phosgene in benzene, dropwise with stirring. Heat is generated during the course of reaction. The octyl carbonate ester of erythromycin is prepared by the procedure described in Example 2 except that triethylamine is employed as an alkalinizing agent in place of the magnesium oxide specified in the example.

*Example 7*

Allyl chloroformate was prepared by treating 29 g. of allyl alcohol at a temperature of about 10–15° C. with 4.4 g. of phosgene. After the addition of the phosgene the reaction mixture is stirred for about one hour. The reaction mixture is washed twice with ice water, and the organic phase is separated and distilled. The fraction boiling at 108–113° C. at a pressure of 745 mm. of mercury, consisted of allyl chloroformate.

10 g. of erythromycin were dissolved in 450 ml. of acetone, and 5 g. of sodium bicarbonate and 50 ml. of water were added. 3.58 g. of allyl chloroformate were added dropwise with vigorous stirring. The mixture was stirred for about two hours and was then filtered to remove inorganic salts. The filtrate was evaporated to dryness in vacuo and the solid residue was suspended in 100 ml. of water and extracted four times with 100 ml. portions of chloroform. The chloroform extracts were combined, were dried over anhydrous magnesium sulfate and evaporated to dryness in vacuo. The residue consisting of erythromycin allyl carbonate was crystallized by dissolving it in 15 ml. of warm acetone, filtering the solution and allowing the filtrate to stand, whereupon the erythromycin allyl carbonate separated in crystalline form. It melted at about 115–118° C. microbiological assay showed the compound to contain about 915 units/mg. of erythromycin activity.

*Example 8*

Erythromycin propargyl carbonate was prepared by substantially the same method as the allyl carbonate, by using propargyl chloroformate, the latter compound being prepared from propargyl alcohol and phosgene in a manner similar to that used for the preparation of allyl chloroformate. Erythromycin propargyl carbonate melted at about 112–117° C., and gave on microbiological assay an erythromycin activity of about 895 units/mg.

I claim:

1. A member of the group consisting of erythromycin aliphatic hydrocarbon carbonates wherein the aliphatic hydrocarbon radical contains from 1 to 14 carbon atoms and erythromycin monocyclic araliphatic hydrocarbon carbonates wherein the aliphatic hydrocarbon radical contains from 1 to 4 carbon atoms.
2. Erythromycin methyl carbonate.
3. Erythromycin ethyl carbonate.
4. Erythromycin benzyl carbonate.
5. Erythromycin allyl carbonate.
6. Erythromycin propargyl carbonate.

References Cited in the file of this patent
UNITED STATES PATENTS

| | | |
|---|---|---|
| 2,378,449 | Tishler | June 11, 1945 |
| 2,483,885 | Crooks | Oct. 4, 1949 |
| 2,653,899 | Bunch et al. | Sept. 29, 1953 |
| 2,662,906 | Edgerton | Dec. 15, 1953 |

OTHER REFERENCES

Spielman: Richter's Organic Chemistry, vol. I, Aliphatic Series, p. 430, pub. by P. Blakiston's Son & Co., Phil., Pa., 1916.

Ross et al.: Clinical Proc. Children's Hosp. (Wash., D.C.), August 1951, pp. 243–246.

Clark: "Antibiotics and Chemotherapy," July 1953, pp. 663–671.

McGuire et al.: "Antibiotics and Chemotherapy," June 1952, vol. II, No. 6, pp. 281–283.

Hasbrouck et al.: "Antibiotics and Chemotherapy," October 1953, pp. 1040 and 1053.

Flyn et al.: J.A.C.S., June 20, 1954, pp. 3121–3125.

U.S. Dispensatory, 24th ed., pp. 963–964, pub. by J. B. Lippincott Co.